United States Patent [19]

Shoptaw

[11] Patent Number: 4,887,469
[45] Date of Patent: Dec. 19, 1989

[54] HIGH ACCURACY TURBINE FLOWMETER WITH OPTICAL SENSOR

[75] Inventor: David R. Shoptaw, Livonia, Mich.

[73] Assignee: Hydro-Craft, Inc., Rochester Hills, Mich.

[21] Appl. No.: 193,293

[22] Filed: May 11, 1988

[51] Int. Cl.$^4$ .............................................. G01F 1/10
[52] U.S. Cl. .............................. 73/861.77; 73/272 R; 73/861.89
[58] Field of Search .............................. 250/239, 574; 73/861.77, 272 R, 861.89; 220/3, 82 R

[56] References Cited

U.S. PATENT DOCUMENTS

| | | | |
|---|---|---|---|
| 2,461,989 | 2/1949 | Roy | 220/82 R |
| 2,527,792 | 10/1950 | Buehler | 220/82 R |
| 2,848,893 | 8/1953 | Tuffet et al. | 73/861.77 |
| 3,021,710 | 2/1962 | Barrere et al. | 73/861.77 |
| 3,217,539 | 11/1965 | Owen et al. | 73/861.77 |
| 3,625,390 | 12/1971 | Meginnis | 220/82 R X |
| 3,936,663 | 2/1976 | Taylor et al. | |
| 3,965,341 | 6/1976 | Honey et al. | |
| 4,282,883 | 8/1981 | Yerushalmy | 73/861.77 X |
| 4,306,457 | 12/1981 | Fukui et al. | |
| 4,428,243 | 1/1984 | Taylor | 73/861.77 |
| 4,458,539 | 7/1984 | Bilstad et al. | |
| 4,581,946 | 4/1986 | Kanayama | |
| 4,593,365 | 6/1986 | Haley, Jr. et al. | |
| 4,707,134 | 11/1987 | McLachlan et al. | 250/574 X |

FOREIGN PATENT DOCUMENTS

0168114 10/1982 Japan .................................. 73/861.77

OTHER PUBLICATIONS

Flo-Tech, Inc. product literature, 25 pages.
TW Webster Instruments product brochure (12 pages).
Flow Technology, Inc. product brochure for Omniflo Turbine Flow Transducers (3 pages).
Brooks Product Information and Selection Guide, Bulletin SP-110, Sep. 1984 (8 pages).
Omega Engineering, Inc. Flow Measurement and Control Handbook and Encyclopedia, 1985/86, Section F (pp. F-1 through F-25).

Primary Examiner—Herbert Goldstein
Attorney, Agent, or Firm—Harness, Dickey & Pierce

[57] ABSTRACT

An electronic flowmeter system including a turbine flowmeter and a digital controller for making highly accurate flow measurements over a wide range of fluid flows and pressures is disclosed. The flowmeter preferably includes a body having a cylindrical bore in which is mounted a turbine having multiple vanes which rotate transversely to the direction of fluid flow. The clearance between the bore and vanes is selected for minimum resistance to fluid flow at extremely low flow rates. Rotation of the turbine vanes is detected by use of a proximity sensor or an optical sensor employing an artificial light and a photodetector. Flow measurements are made by digitally measuring the time periods between successive input pulses generated by detection of the rotating vanes of the turbine. For high temperature or intrinsically safe applications, the optical sensor is used with a fiber optic cable so that the light source and photodetector can be located remotely from the flowmeter. For high pressure applications and applications involving flow measurements of chemically active fluids, a sensor housing including a stainless steel casing and a protective glass window at one end of the centrally-located hole passing through the casing is used.

7 Claims, 7 Drawing Sheets

| ROW NO.($i$) | RANGE (IN GPM) | MAX $f_v$ (IN Hz) | MAX RPS (IN Hz) | MIN. CCN | LIN. APPROX. VALUE (LA) | FIFO SIZE (M) |
|---|---|---|---|---|---|---|
| 1 | 0.1 to 0.5 | 2.2 | 0.36$\bar{6}$ | 1,363,636 | 670,000 | 3 |
| 2 | 0.5 to 1.0 | 4.4 | 0.73$\bar{3}$ | 681,818 | 670,000 | 4 |
| 3 | 1.0 to 1.5 | 6.7 | 1.11$\bar{6}$ | 447,761 | 670,000 | 5 |
| 4 | 1.5 to 2.5 | 12.1 | 2.01$\bar{6}$ | 247,934 | 615,000 | 6 |
| 5 | 2.5 to 3.5 | 17.5 | 2.91$\bar{6}$ | 174,429 | 605,000 | 7 |
| 6 | 3.5 to 4.0 | 20.0 | 3.3$\bar{3}$ | 150,000 | 600,000 | 8 |
| 7 | 4.0 to 6.0 | 30.7 | 5.11$\bar{6}$ | 97,720 | 585,000 | 9 |
| 8 | 6.0 to 8.0 | 41.0 | 6.8$\bar{3}$ | 73,171 | 585,000 | 10 |
| 9 | 8.0 to 9.0 | 44.6 | 7.4$\bar{3}$ | 67,265 | 585,000 | 10 |
| 10 | 9.0 to 100.0 | — | — | — | 585,000 | 12 |

334 / 338 / 340 / 342 / 336 / 344 /

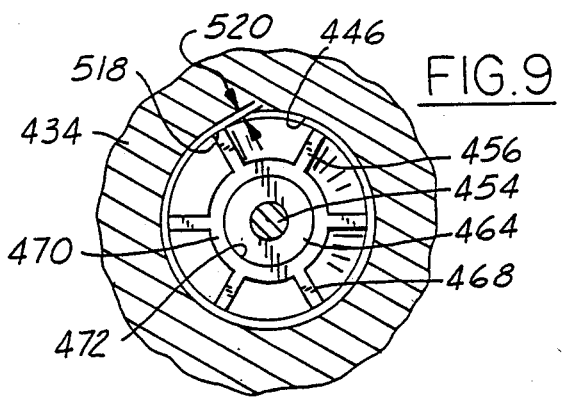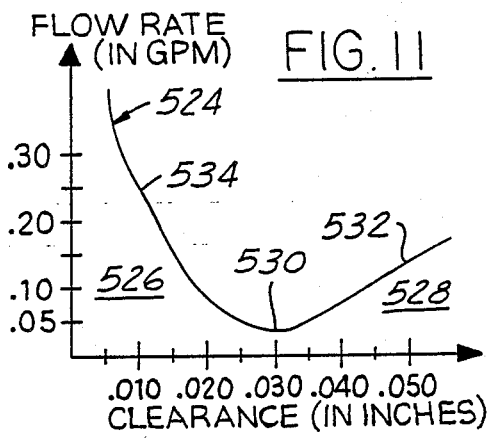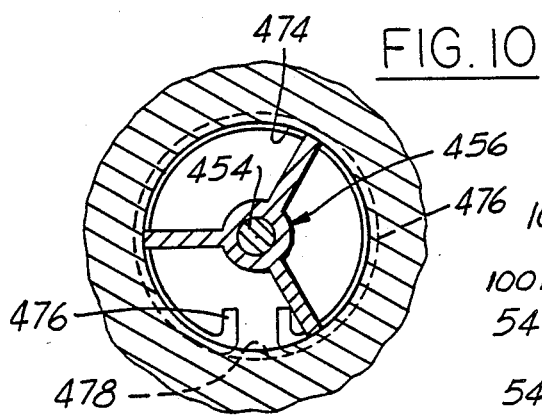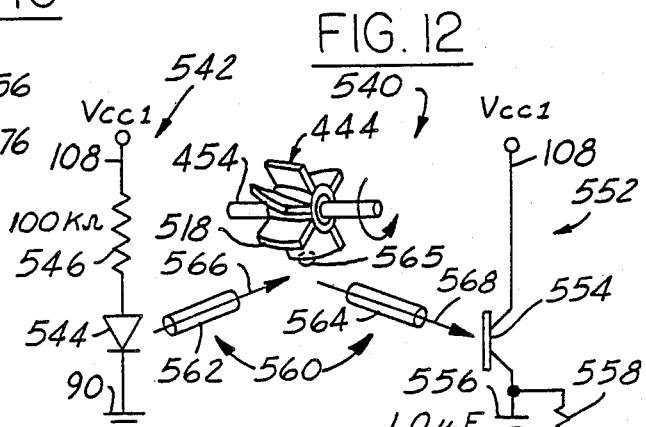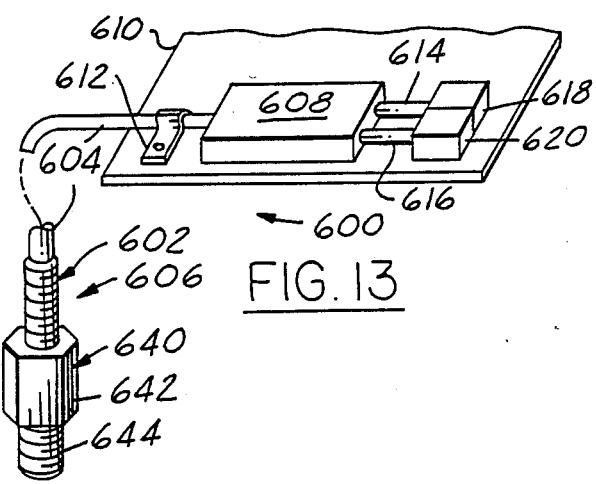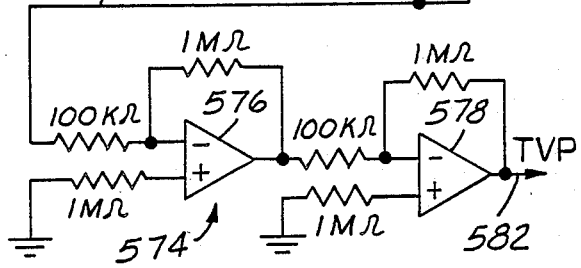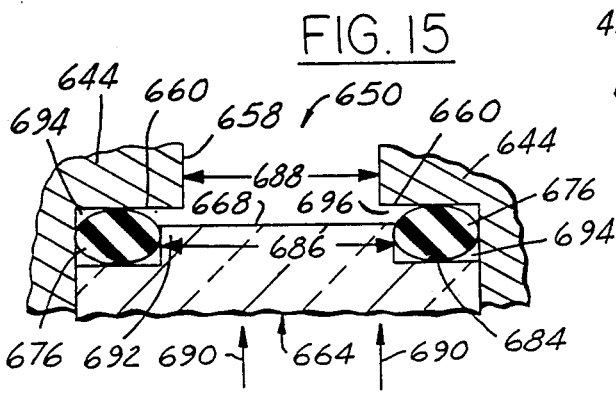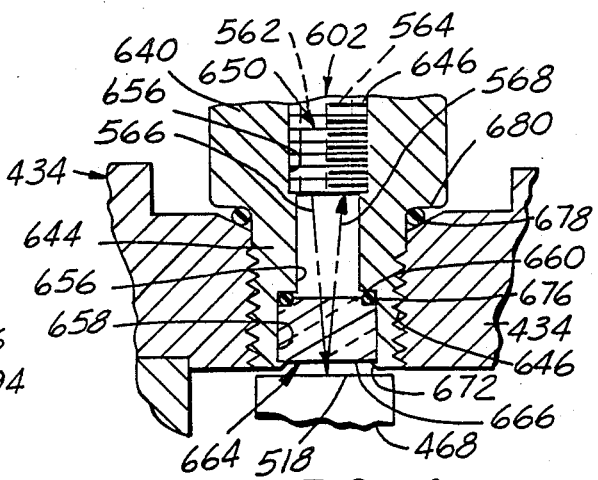

HIGH ACCURACY TURBINE FLOWMETER WITH OPTICAL SENSOR

FIELD OF THE INVENTION

This invention relates in general to flowmeters utilizing a turbine having a plurality of vanes, and in particular to high accuracy flowmeters and optical sensors for detecting rotation of the turbine vanes, methods of using such optical sensors, and constructions for optical sensors that are resistant to high temperatures and pressures and to chemical attack.

BACKGROUND OF THE INVENTION

Turbine flowmeters have long been used to measure fluid flow for a wide variety of applications. One type of conventional flowmeter utilizes an axialflow turbine disposed within a cylindrical bore of the flowmeter body. As fluid passes through the bore, it impinges upon the vanes of the turbine and causes rotation at a rate generally proportional to the rate of fluid flow. When the fluid is a liquid moving through the flowmeter at a moderate rate, the rate of rotation of the turbine is a fairly linear function of the fluid flow rate. Accordingly, some such conventional flowmeters, over a limited or narrow range such as one order of magnitude, exhibit one percent or better accuracy. However, when the flow rates are drastically reduced, the relationship between the rate of turbine rotation and the actual flow rate of the fluid is rather nonlinear so flowmeter accuracy is not maintained in such low-flow regions of operation.

Many electrohydraulic servo system applications, product packaging applications involving the dispensing of predetermined amounts of liquid such as the filling of beverage bottles, petroleum distribution applications such as retail sales of gasoline and scientific instrumentation applications would greatly benefit from turbine flowmeters which exhibit a high degree of accuracy over a broad fluid flow range of three or more orders of magnitude. To the best of our knowledge, conventional turbine flowmeters have not exhibited high accuracy over a flow range of two or more orders of magnitude. Normally, the problem of inaccuracy is most acute in the extremely low flow portions of the fluid flow range of the flowmeter.

In one model of prior art flowmeters, a magnetic pick-up coil through which current is run is used to detect rotation of the vanes of the turbine. The pick-up coil is placed within the sidewall of the flowmeter body, adjacent to the cylindrical bore in which the turbine is rotating. Only when the rotation rate is sufficiently high are the changes in the local reluctance adjacent the coil due to the vanes rapidly passing by, large enough to induce a detectable millivolt or microamp change in the current running through the coil. The frequency of the detectable change in current or voltage is directly proportional to the rotation rate of the turbine. Thus, a magnetic pick-up coil system inherently lacks the sensitivity required to produce a detectable electrical change when the turbine is rotating very slowly. So, in flowmeters using this type of vane sensor, the ability to accurately measure low flow rates is limited by the sensor itself as well as the nonlinearities previously described.

Another problem encountered with certain magnetic pick-up coil arrangements is that the magnetic field produced by the coil is strong enough to tend to stop a ferromagnetic turbine from rotating at extremely low flow rates. This occurs when the attraction of the ferromagnetic material in a vane by the magnetic field produced by the coil when the vane is close to the coil is stronger than the rotation-inducing mechanical forces of the flowing fluid. When this happens, the vane tends not to rotate freely away from the position of maximum magnetic coupling with the coil and introduces further nonlinearities at low flow rates. In one such flowmeter, we have observed a condition where the magnetic coupling was sufficiently strong to inhibit all rotation of the turbine below a flow rate of 0.5 gallons per minute (gpm) in a cylindrical bore approximately 0.7 inches (18 millimeters) in diameter, which thus effectively dictates the lower limit of operation of a turbine flowmeter.

We have found that certain magnetic proximity sensors which contain a tiny electronic circuit within the sensing head produce such tiny magnetic fields that they do not exhibit the foregoing magnetic coupling problem. The circuit within such magnetic proximity sensors includes an oscillator and amplifier so that an amplified pulsating analog output is produced directly from the sensor, thereby beneficially increasing the strength and sensitivity of the pulsating output signal.

While the later type of magnetic proximity sensors work well in low-temperature applications, they cannot be used in applications involving the measuring of higher temperature fluids. This is because the self-contained circuitry cannot withstand temperatures in excess of 65 degrees to 90 degrees Celsius (C). Thus, such flowmeters cannot be used to measure the flow of a fluid whose temperature is within or in excess of these values without destroying the sensors, unless water cooling or the like is provided which, in many applications, is prohibitively expensive or impractical. Thus, temperature constraints imposed by existing magnetic proximity sensor technology is a real problem.

There are numerous applications for flowmeters in flammable or explosive atmospheres, such as are found in petroleum refineries, mills, mines, munitions plants, gasoline filling pumps and the like. In such applications, electrically-operated magnetic proximity sensors cannot be used unless they are enclosed within a suitable explosion-proof enclosure, which is, of course, very costly. We understand that there has been a longstanding need for a high-accuracy intrinsically safe turbine flowmeter which could be used in such hazardous environments.

Axial flow turbine flowmeters are preferred at least for liquids over the paddle-wheel flowmeters because they have a greater dynamic range, especially at higher flow rates. In the conventional axial flow turbine flowmeters I have studied, too much clearance between the wall of surface of the cylindrical bore and the outermost edges of the vanes of the turbine results in a stalled rotor condition at extremely low flow rates. In other words, too much of the liquid to be measured at such low rates flows around the outside of the vanes and not enough impinges on the vanes, so the turbine does not rotate. However, my research has shown that too little clearance can produce a similar effect due to viscous coupling between the vanes and side walls. Thus, is would be desirable to have a turbine flowmeter whose clearance was optimized for extremely low flow measurements.

In a number of fluid flow-measuring applications, the flowmeter is subject to varying pressures, ranging from anywhere from about 5 or 10 atmospheres up to 100 or 200 atmospheres. In certain applications, such as high pressure hydraulic systems, the fluid pressure may be higher still, such as up to 400 atmospheres or more, with pressure transients that may be higher still. It would be very desirable to have a high accuracy turbine flowmeter with wide dynamic range for such applications.

Many fluid flow-measuring applications involve chemically active fluids such as petroleum products, solvents, acids and bases. Thus, it would also be desirable to have a high accuracy turbine flowmeter which could be used in such applications. In particular, it would be desirable to have one common sensor for detecting turbine vane rotation which would be suitable for almost all such applications, whether the application involved high temperature fluids, high pressure fluids or chemically active fluids or a combination of any two or three of these conditions.

There has been a longstanding need in the hydraulics industry for a way to test electrohydraulic servo valves to determine whether they are operating properly. Many of these servo valves have an extremely wide dynamic response range. To test such valves and to analyze the source of problems within such valves, it would be very useful to have a electronic flowmeter having an accuracy of greater than one percent over a range of flows three or more orders of magnitude.

In light of the foregoing problems and desires, it is an object of the present invention to provide a turbine flowmeter and turbine rotation sensor for an electronic flowmeter system which is capable of highly accurate flow measurements over a very wide range of flow rates, i.e., greater than three orders of magnitude.

It is object of the present invention to provide an axial flow turbine flowmeter having clearances between the turbine vanes and cylindrical bore optimized for detecting extremely low flow rates, especially for liquids having a viscosity between 100 and 300 SSU.

One more object of the present invention is to provide a flowmeter having an optical sensor for detecting turbine vane rotation.

Still another object of the present invention is to provide an optical sensor for detecting turbine vane rotation which is capable of withstanding high temperatures in the ambient environment by using fiber optics, and which can be made intrinsically safe by locating its artificial light source and photodetector remotely from the turbine.

Another object is to provide an optical sensor housing having a protective transparent window and capable of withstanding contact with chemically active fluids whose flow is being measured.

Yet another object of the present invention is to provide an optical sensor housing having a transparent window construction which is capable of withstanding moderate fluid pressures (i.e., pressures between 5 and 10 atmospheres), up to high fluid pressures (i.e., pressures between 100 or 200 atmospheres), and even extremely high pressures (i.e., pressures in excess of 400 atmospheres).

SUMMARY OF THE INVENTION

In light of the foregoing problems, desires and objects, there is provided according to a first aspect of the present invention, a turbine flowmeter provided with optical means for measuring fluid flow. The flowmeter comprises: a flowmeter body having a passage therethrough through which a fluid to be measured flows and a first opening distinct from the passage; a turbine having a plurality of vanes rotatable about a common central axis in response to flowing fluid impinging upon the vane; a protective window means for allowing optical detection of the vanes; and means for generating an electromagnetic signal indicating whether a vane is optically detected through the window means. The turbine is disposed relative to the body such that the vanes rotate at least partly within the passage. The window means is disposed in the opening in the body such that each vane in turn is optically detectable at a predetermined location as it rotates by the window means, and the means for generating optically detects the vanes when they are in the predetermined location. The means for generating preferably includes an artificial light source for providing light through the window means to the predetermined location. It also preferably includes photodetector means for detecting light from the light source being reflected by the vanes of the turbine back through the window means. In a version of this invention particularly suited for high temperature applications, the artificial light source and photodetector means are both disposed at a location remote from the flowmeter body, and the means for generating further includes optical fiber means for transmitting light back and forth between the remote location and a location in the opening adjacent to and on a side of the window means opposite from the predetermined location. The window means preferably includes a window of generally circular cross-section made of glass resistant to thermal shock and chemical attack, and a protective casing for captively supporting the window, which is preferably made of stainless steel.

According to a second aspect of the present invention, there is provided a method of optically detecting rotation of a turbine having multiple vanes and rotating within a passage within a body of a flowmeter. The method comprises the steps of: (1) providing a protective window mounted within the body through which a portion of each vane may be observed in sequence as each vane passes by a predetermined location within the body; (b) illuminating the predetermined location with an artificial light source located on a first side of the window opposite the vanes; (c) detecting light from the artificial light source reflected off of a predetermined portion of each vane as such portion passes through the predetermined location. Steps (b) and (c) are preferably carried out by transmitting light from the artificial source at a remote location through a fiber optic cable to a location near the first side of the window and transmitting light reflected off the edge of the vane in the predetermined location back through the fiber optic cable to a photodetector at the remote location.

According to a third aspect of the present invention, there is provided an optical sensor housing for use in a flowmeter having a body with a passage therethrough through which the fluid to be measured flows and having a turbine provided with multiple vanes located at least partially within the passage. The sensor housing comprises: a rigid casing having a elongated hole therethrough having first and second ends; and a protective window securely mounted in the hole near the first end thereof. The window is made at least primarily of optically transparent material, and have a thickness relative to its lateral dimensions which enables the window to withstand a static pressure difference of at least about five atmospheres across the window produced by a high pressure condition of fluid in the passage. The rigid casing near the second end of the hole is adapted to receive in the hole at least part of an optical means for detecting light modulated by movement of the vanes of the turbine within the passage. The optically transparent material is preferably a material resistant to thermal shock which can withstand a sustained temperature in excess of 300 degrees C. The window is preferably provided with polished first and second opposed surfaces so that the light is not diffused as it passes through the window.

The hole within the casing preferably has first and second regions of differing nominal cross-sectional areas so that a shoulder is formed at the boundaries between the first and second regions. The shoulder supports the window along substantially all of its periphery in a direction generally perpendicular to the nearest polished surface. This helps prevent the window from moving when a significant static pressure difference exists across the window due to the fluid in the passage being under pressure. Cushioning means such as a flexible gasket material that deforms under pressure and is preferably located at least in part between the shoulder and the nearest polished surface of the window. When such a means for cushioning is provided, a glass window made of Pyrex can withstand static fluid pressure in excess of 300 atmospheres without shattering.

According to a fourth aspect of the present invention, there is provided a turbine flowmeter for accurately measuring flows of a predetermined liquid having known viscosity characteristics over a wide range of flows including a low flow region wherein the turbine rotation rate is less than one revolution per second. The turbine flowmeter comprises: a body having at least one substantially cylindrical bore through which fluid to be measured passes; and a turbine having a plurality of vanes and mounted for rotation entirely within the cylindrical bore and having an axis of rotation concentric to the axis of rotation of the bore. The vanes of the turbine have a clearance with respect to the bore which allows substantially minimum resistance to turbine rotation in response to extremely low rates of fluid flow through the bore. Such a clearance is less than about 0.050 inch. Where the liquid has viscosity in the range of about 100 SSU to about 300 SSU, the selective clearance should be between about 0.020 inch and about 0.04 inch. For a hydraulic fluid having a viscosity in the range of about 120 SSU to about 210 SSU, and the number of vanes on the turbine is at least 6 for a bore having a diameter in the range of 0.625 inch to 1.75 inch, the preferred clearance is between about 0.025 inch to about 0.035 inch.

These and other aspects, objects, features and advantages of the present invention will be better understood by considering the detailed description below and the appended claims in conjunction with the drawings.

BRIEF DESCRIPTION OF THE DRAWINGS

In the accompanying Figures, where like items and features are identified by identical reference numberals in the various Figures:

FIGS. 2 and 3 together form a detailed electronic schematic diagram for a preferred embodiment of the FIG. 1 electronic flowmeter system, wherein: FIG. 2 shows the power supply section circuit and the proximity sensor interface circuit.

FIG. 9 is fragmentary cross-sectional view taken along line 9—9 of FIG. 7 showing the turbine of the flowmeter.

FIG. 10 is a fragmentary cross-sectional view taken along line 10—10 of FIG. 7 showing the separator and retaining ring of the flowmeter.

FIG. 11 is a graph which illustrates the general relationship between minimum detectable flow rate for a 150 SSU hydraulic oil and the clearance between the turbine vanes and the cylindrical bore in which the turbine rotates.

FIG. 12 conceptually shows the use of an optical sensor for detecting turbine rotation, and also shows a preferred interface circuit for the optical sensor.

FIG. 13 is a fragmentary perspective view showing a preferred optical sensor arrangement for detecting turbine rotation that uses a fiber optic cable with an optical sensor housing at a first end thereof and an artificial light source and photodetector at the other end thereof remote from the first end.

FIG. 14 is an enlarged fragmentary cross-sectional view of the window end of the FIg. 12 optical sensor housing mounted in the flowmeter body and sensing one of the turbine vanes.

FIG. 15 is a further enlarged fragmentary view showing the O-ring between the shoulder and window in the optical sensor housing.

DETAILED DESCRIPTION OF THE PREFERRED EMBODIMENT

Figure 1:
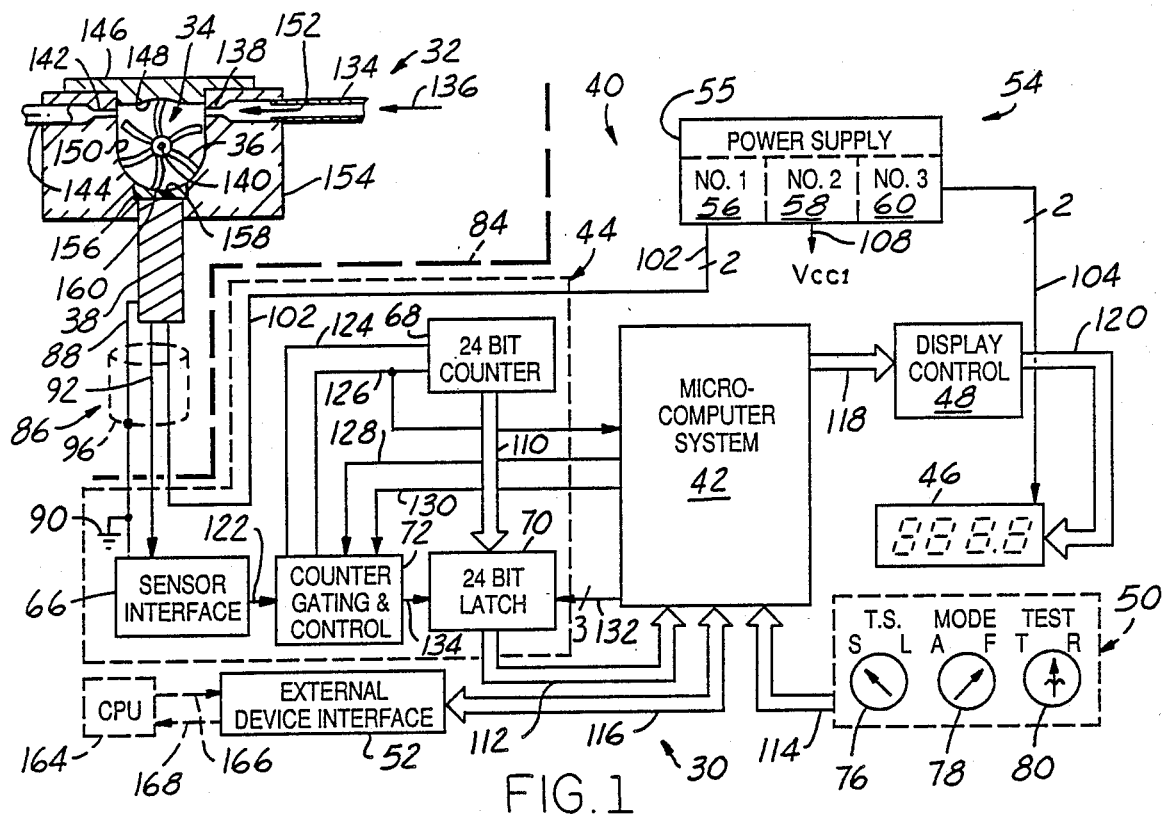
FIG. 1 is a block diagram of the electronic flowmeter system of the present invention showing one kind of turbine flowmeter, a magnetic proximity sensor for detecting the rotating turbine vanes, and the microprocessor-based electronic controller used to process the signals from the sensor to generate and display flow-related information.

Referring now to FIG. 1, there is shown a block diagram of the electronic flowmeter system 30 of the present invention which includes a turbine flowmeter 32 having a turbine 34 with multiple vanes 36, a magnetic proximity sensor 38 for detecting the rotating vanes of the turbine, and a digital electronic controller 40. The controller 40 includes a microcomputer system 42, dedicated signal processing circuitry 44, a multiple digit display 46, a display control circuit 48, operator input means 50, an external device interface circuit 52 and a power supply section 54. The power supply section 54 may include may include a common AC-to-DC subsection 55 and first, second and third DC power supplies 56, 58 and 60.

The signal processing circuitry 44 includes a sensor interface circuit 66 connected to the sensor 38, a high speed high capacity digital counter 68, and equally high capacity digital latch 70, and a counter and gating control (CGC) circuit 72. The functions of the counter, latch and CGC circuit will be explained shortly.

The operator input means 50 may include any needed or desired operator inputs. In one preferred electronic controller three different switches 76, 78 and 80 are used by an operator to specify various functions or states. Switches 76 and 78 are two position selector switches, while selector switch 80 may be a three-position selector switch which is spring-returned to center from either the right position or the left position. The TS selector switch 76 is used for specifying turbine size (TS), which may be either small (S) or large (L). In a preferred axial-flow turbine flowmeter of the present invention, the small size corresponds to a turbine body having a cylindrical bore nominally 0.75 inches in diameter, while the large size corresponds to a turbine body having a cylindrical bore nominally 1.325 inches in diameter. These two flowmeters have a maximum flow rate respectively of 100 gpm and 150 gpm. The Mode selector switch 78 is used to specify which of two modes the system 30 will operate. When the selector switch 78 is turned to its right or "F" position, the system 30 outputs the current flow rate being detected by the flowmeter 32. When the switch 78 is in its left or "A" position, the system 30 outputs the total or accumulated flow from the last start time. The selector switch 80 labeled "TEST", when put in the right or "R" position resets the accumulated count. When put in the left of "T" position the system 30 performs any preprogrammed self-test functions, such as turning on all of the segments in the display 46 and other conventional self-diagnostic routines useful to verifying the condition or readiness of the flowmeter system to perform properly. Such self-test routines are common in microprocessor based electronic controllers, form no part of the present invention, and need not be described here.

The heavy dashed line 84 represents physical separation and/or isolation between the flowmeter 32 and the electronic controller 40. Such separation/isolation may be desirable or required in the particular application where the flowmeter is being utilized. For example, the flowmeter 32 may be used in a rugged environment not suited for locating the electronic controller 40 in and accordingly, the electronic controller may be inside of a protective enclosure. Alternatively, the flowmeter 32 may be located at some distance from the controller 40. A conventional signal cable 86 which may include a ground conductor 88 tied to ground 90, a power conductor and a signal conductor 92 provides a pathway for signals between the sensor interface 66 and proximity sensor 38. To provide additional immunity from electromagnetic induction or other electrical transients, the ground conductor 92 may be fabricated as a conventional ground field shield represented by dotted line 96.

Figure 2:
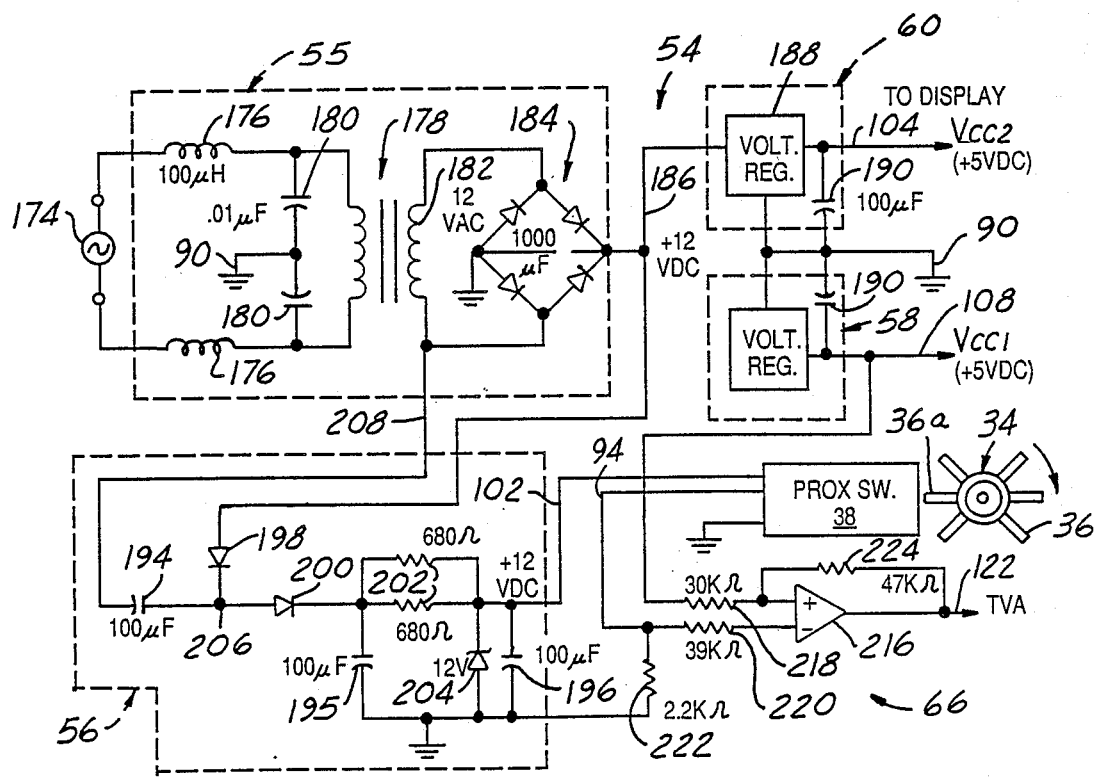

The power supply 54 may have any suitable number of separate supplies, depending upon the particular requirements of sensor 38 and the electronics within controller 40. In the embodiment shown in FIG. 1, power supply 56 provides current to the sensor interface circuit 66 as indicated by conductor 102, while power supply 60 provides power to multi-digit display 46 via conductors 104. The second power supply 58 is utilized to supply the regulated DC power (VCC1) required by the remainder of the components of controller 40. Any conventional or suitable power supply design and construction may be used. One possible embodiment for power supply section 54 is shown in FIG. 2.

A number of the blocks within the controller 40 are interconnected by buses or similar multiple conductor signal paths such as signal paths 110 and 112 which respectively connect the counter 68 to the latch 70, and the latch 70 to the microcomputer system 42. Other such signal paths are paths 114 and 116 between the microcomputer 42 and the operator input means 50 and the external device interface 52, respectively. Similar paths 118 and 120 are found between the microcomputer system 42 and the display controller 48, and the controller 48 and multiple digit display 46, respectively. Lines 122-132 represent conductors for single signals being sent between various blocks.

The flowmeter 32 shown in FIG. 1 is connected to and receives fluid to be measured from inlet conduit 134, which fluid moves in the direction indicated by arrow 136. The fluid will normally be a liquid, such as hydraulic oil, liquid chemicals or refined petroleum products. Flow measurements of a gas require uniform temperature and pressure, while flow measurements of a substantially incompressible liquid may be made at varying pressures without much effect, if any, on accuracy. The fluid is directed through a somewhat smaller orifice 138 toward the vanes 36 or the turbine 34 which rotates about a central axis 140. The flow of the fluid proceeds to the left as shown in FIG. 1 to the opening 142 which leads to the outlet conduit 144. Thus, it may be appreciated that the turbine 34 operates in paddle-wheel fashion, with the fluid flow being transverse to the axis 140. In preferred embodiments of the present invention designed for liquids such as a hydraulic oil, an axial flow turbine flowmeter is utilized, as will later be described in FIGS. 8-11. Paddle-wheel turbine flowmeter 32 may be of any suitable or conventional type, and is shown in FIG. 1 to illustrate the generality of the flowmeter system of the present invention.

The flowmeter 32 also includes a cover plate 146 having a cylindrical arcuate surface 148 near which the outermost edges of the blade 36 pass. The cover 146 is used to seal up the cavity 150 of U-shaped cross-section in which the turbine is disposed, and which forms part of the overall passage 152 through which fluid flows as it passes through the body 154 of the flowmeter 32. The body 154 is preferably made of a non-magnetic rigid material such as an aluminum or magnesium alloy. At the bottom of the U-shaped cavity 150 is located a non-magnetic spacer 156 which may be made of any conventional or suitable material including dielectric material. The spacer 156 has an inner cylindrical arcuate surface 158 near which the outermost edges of the vanes 36 of the turbine 34 pass. The magnetic proximity sensor 38 is preferably a self-contained commercially available magnetic proximity switch with integrated electronics, including an oscillator and amplifier for generating a small magnetic field projected in the vicinity of arcuate surface 158 to detect the outermost edge of the vanes 36, such as tip 160, as they pass a predetermined location adjacent to arcuate surface 158. One such self-contained proximity switch is Model No. ET111 from Namco Controls Company of Mentor, Ohio, which is normally open, and closes upon detecting the presence of ferromagnetic material within the predetermined location. The turbine 34 including its vanes 36 are made of ferromagnetic material to ensure that their presence in the predetermined location causes the proximity detector 38 to produce an output.

The signal output line 92 from proximity sensor 38 is an electromagnetic signal whose period is inversely proportional to the rate of rotation of the turbine 34, as determined by the detected movement of the vanes 36 past the predetermined location. The sensor interface circuit 66 conditions this raw electromagnetic input signal and presents it to the CGC circuit 72. A high speed time base signal having a pulse rate of at least ten times that of the maximum expected pulse rate of the input signal on line 122 is provided to the CGC circuit 72 via line 128 from the microcomputer system 42. The circuit 72 uses the relatively slow-speed input signal on line 122 from the sensor interface circuit 66 to gate the time base signal for delivery on signal line 124 to digital counter 68. The CGC circuit 72 also provides a reset signal to the counter 68 via line 126. The high-frequency clock pulses appear on line 122 for the interval of time between two successive pulses produced by the detection of successive vanes 36 by switch 38. After one such cycle is complete, the CGC circuit 72 stops the delivery of pulses to the counter 68 via line 124, and a signal on control line 134 from the CGC circuit commands the latch 70 to read the current count number (CCN) presently found in the counter. The CCN is thus a first numerical value proportional to the period of the electromagnetic input signal from the sensing means 38.

Thereafter, the CGC circuit 72 produces a reset pulse on line 126 which resets the counter 68 and interrupts the microcomputer system 42. Then, the system 42 sends appropriate read signals via signal path 132 to the latch 70, causing the latch circuit 70 to place its contents on bus 112 so that the system 42 can read the first numerical value CCN.

Next, the microcomputer system 42 produces from the first numerical value just read a second numerical value adjusted to compensate for any predetermined nonlinearity between the rate of rotation of the turbine 34 and the rate of fluid flow through the body 154 of the turbine flowmeter 32. As previously explained, compensation for nonlinearities may not be required for higher flow rates, particularly where an axial flowmeter is utilized to measure a liquid. However, it is virtually always necessary to adjust the first numerical value in order to compensate for nonlinearities experimentally determined to exist in the low flow regions of operation of the flowmeter.

Next, the microcomputer system 42 operated in one of two ways, depending upon the setting of the mode switch 78. When the mode switch is in its right or "F" position, the system 42 preferably computes an average of several successive readings, such as ten readings of the second numerical value, and passes this computed average flow rate (AFR) along to the display control 48 for his presentation on the visual display 46. To compute the average value, the successive readings are stored in a FIFO stack within the random access memory (RAM) of system 42. To compute the average the last "M" second numberical values are summed together and then divided by "M" to compute the average value to be displayed. The value of "M" may be fixed at any suitable integer value, such as ten, or may vary as a function of the rate of turbine rotation. For example, for higher rates of rotation, the last twenty to thirty entries within the stack may be added, whereas for very low flow rates, the last three to five values from the stack may be averaged. The benefit of using such a larger value of "M" when the flow rate is higher is that a somewhat more accurate flow rate may be displayed. The benefit of using a smaller value of "M" when the flow rate is extremely slow is that the readings presented on the visual display 46 correspond more closely with actual variations in flow rate. However, more fluctuations will be seen as the value of "M" is reduced.

In the second mode of operation when Mode switch 78 is in its "A" position, the microcomputer system 42 accumulates a running total of the second numberical values as a Total Accumulated Count (TAC) value in order to be able to display the accumulated flow for a given interval of time. The interval of time extends from the time that a Reset Accumulated Flow command is received by system 42. This command is generated when microcomputer 42 is powered up, when switch 80 is momentarily placed into its "R" (for reset) position, or when an appropriate command is received from external device interface 52. The TAC value representing the accumulated flow that is displayed is preferably updated at least once per second or more often. Thus, a person observing visual display 46 will be a steadily increasing value being displayed. If desired, the number of digits in display 46 may be increased to six or more to display the full accuracy of the total being accumulated, if desired.

The microcomputer system 42, before sending out the data to the display controller 48, first scales the AFR value or TAC value so that the value which is presented on display 46 is in terms of the desired units, whether that be gallons per minute, cubic inches per second, cubic centimeters per second, or liters per minute, or the like. This scaling factor is preferably stored within the read only memory (ROM) of the microcomputer system 42 so that the value is not lost when the controller 40 is powered down. Similarly, the correction factors for adjusting for nonlinearities, as well as the general computer program utilized to operate the microcomputer system 42 in accordance with the above-described sequence, is also preferably stored in ROM.

The microcomputer system 42 may, if desired, provide the same information being presented on display 46 to the external device interface 52 via the signal path 116. The external device interface may be also used for unidirectional or bidirectional communications with an external device 164, which may be another computer's central processing unit (CPU) or a control system. Dashed line 166 and 168 represent the communications path between interface 52 and external device 164. This communication path may take any conventional or suitable form. As those in the art will appreciate, the microcomputer system 42 may also receive commands from the external device 164 and respond to them as requested. For example, the external device 164 may periodically ask microcomputer system 42 to provide the latest AFR or TAC value presently held in RAM. Similarly, the external device 164 may command the system 42 to operate in either of the accumulating mode or the flow rate mode (in lieu of having the operator set the mode via switch 78), may reset the accumulating value when the system is operating in the accumulating mode, may instruct the microcomputer system currently held value in different units on visual display 46, and the like. This type of interaction between two digital processing units is well understood in the art, and details of its implementation need not be further discussed here.

FIGS. 2 and 3 together form a detailed electronic schematic diagram of a preferred embodiment of the FIG. 1 electronic controller 40. The circuitry of FIGS. 2 and 3 will be described and its specific function explained in order to better illustrate how the FIG. 1 system can be implemented. Preferred values for various selected discrete components are shown either on the drawings or in Table I below.

FIG. 2 shows the power supply section 54 and proximity sensor interface circuit 66 in detail. The common supply subsection 55 may take the form of a rechargeable battery pack (not shown) or a conventional AC-to-DC unregulated power supply section. As shown, power from a conventional 50 or 60 Hertz AC power source 174 is filtered by inductors 176 before reaching step-down transformer 178. Capacitors 180 help remove high frequency noise that may be coming from the source. The secondary winding 182 of the transformer 178 powers a full wave rectifier bridge 184 to convert the 12 volts AC into an unregulated nominal 12 volts DC supply at node 186. Conductors from node 186 feed the unregulated 12 volts DC to first, second and third power supplies 56, 58 and 60 which respectively produce +5 volts DC and +5 volts DC on conductors 102, 108 and 104. Power supplies 58 and 60 each include a conventional voltage regulator chip 188 and filter capacitor 190.

Power supply 56 includes a voltage doubling circuit consisting of filter capacitors 194, 195 and 196, diodes 198 and 200, parallel resistor network 202, and 12-volt zener diode 204. Node 206 is kept at approximately +12 volts through diode 198 by current supplied by node 186. As the instantaneous voltage on conductor 208 rises above zero volts, the voltage at node 206 rises as well, forcing diode 198 to become non-conducting while pushing current across diode 200 to charge capacitor 195 and feed current through resistor network 202. Line 102 is kept at 12 volts DC by zener diode 204. Node 208 remains at slightly more than 12 volts, and node 102 remains at 12 volts as long as the proximity switch 38 does not consume more power than is supplied through diode 200.

The sensor interface circuit 66 shown in FIG. 2 includes an operational amplifier 216 and resistors 218–224. As previously explained, the proximity switch 38 is normally open, meaning that no current passes from conductor 102 to conductor 94, unless a vane 36 is detected near the front end of the proximity switch. As the rotation of the turbine 34 causes the blade 36 to move into the position shown in FIG. 2, the proximity switch 38 begins to conduct, allowing the voltage on conductor 94 to rise. Eventually, the voltage on the negative input of amp 216 exceeds the voltage supplied through resistor 218 to the positive input terminal of amp 216, causing the output of amp 216 to switch to switch from a high condition (+5 VDC) to a lower condition (approximately 0.0 VDC). Thus, the signal line 122 may be called the turbine vane absent (TVA) signal which is high when the switch 38 does not detect a turbine vane and low switch 38 does detect at turbine vane.

Figure 3A:
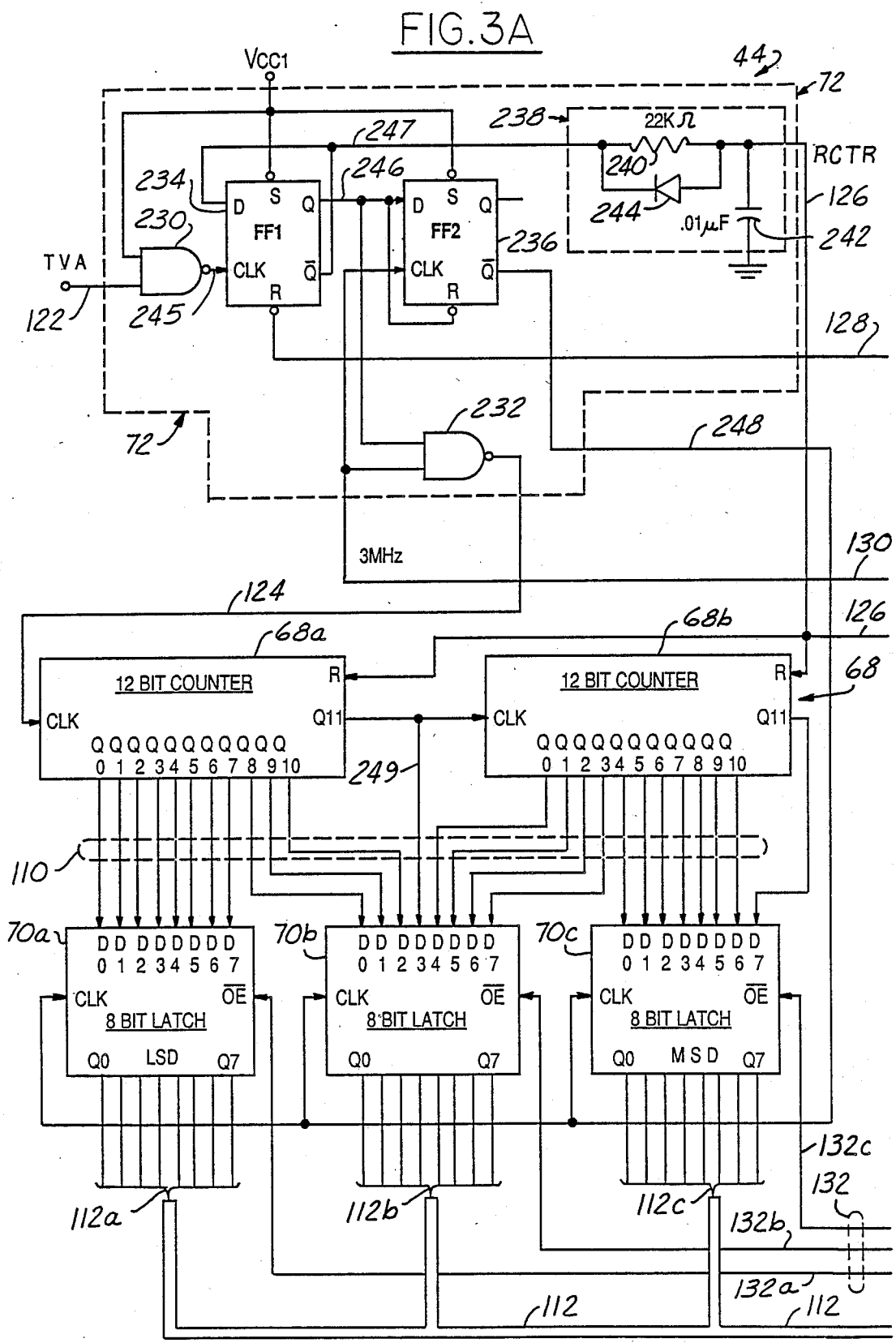
FIGS. 3A, 3B and 3C form a single large FIG. 3 when laid edge-to-edge from left to right, with FIG. 3A showing the counter gating and control circuit, the 24-bit counter, and the 24-bit addressable latch, FIG. 3B showing the microcomputer system including microprocessor, memory, I/O ports and external device interface, and FIG. 3C showing the circuitry of the display controller and 4-digit LED display.

FIG. 3A shows the dedicated signal processing circuitry 44. The CGC circuit 72 includes Schmitt-trigger NAND gates 230 and 232, type-D flip flops 234 and 236, RC time delay network 238 composed of resistor 240, capacitor 242 and bypass diode 244. The counter 68 may be comprised of two 12-bit counters 68a and 68b. The 24-bit latch 70 is preferably comprised of three separate 8-bit latches 70a, 70b and 70c, with 70a being the least significant byte (LSB) and latch 70c being the most significant byte (MSB).

Figure 3B:
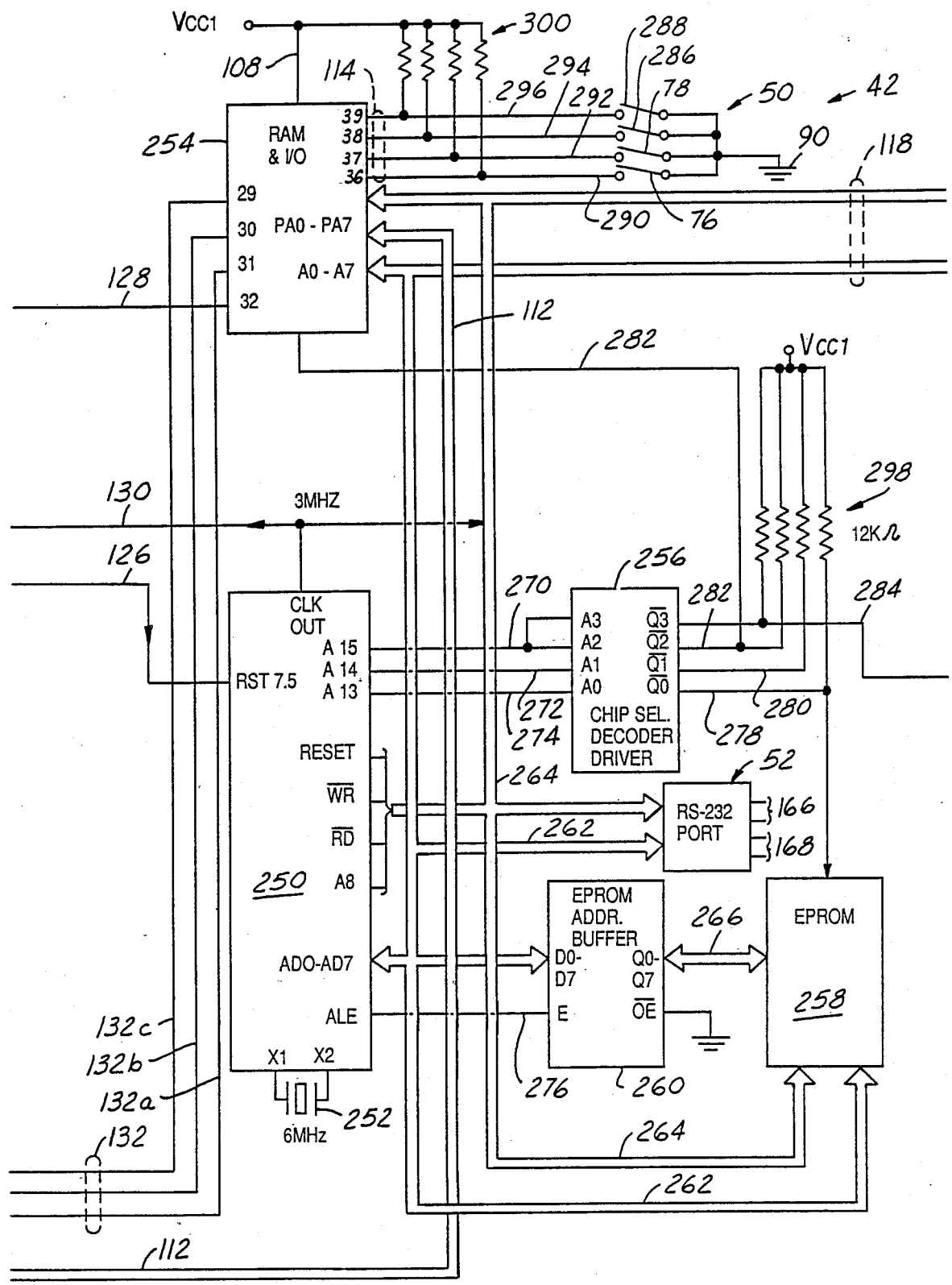

FIG. 3B shows one possible arrangement for the microcomputer system 42. As those skilled in the microprocessor art will appreciate, any other suitable design may be used for microcomputer system 42. The various components of circuitry 44 are connected as shown with conductors 245–248 and other conductors previously identified in FIG. 1.

The system 42 includes microprocessor 250 with an external 6-Megahertz crystal 252 for a time base reference, RAM and input/output (I/O) block 254, chip selector decoder/driver 256, electrically programmable read-only memory (EPROM) 258 and EPROM address buffer 260. The various components of microcomputer system 42 are connected as shown in FIG. 3B by 8-line data bus 262, multiple line control bus 264, dedicated address bus 266 and various conductors 270–282. Conductor 284 leads to the display control circuit 48 shown in FIG. 3C. FIG. 3B also includes operator input block 50 comprised of four single-pole single-throw normally open DIP switches 76, 78, 286 and 288 which are connected by wires 290–296 to the I/O block 254. Switches 286 and 288 are used to implement the function of switch 80, without the springreturned feature. FIG. 3B also includes an RS-232 port used as the external device interface 52. Resistor groups 298 and 300 are pull-up resistors.

Figure 3C:
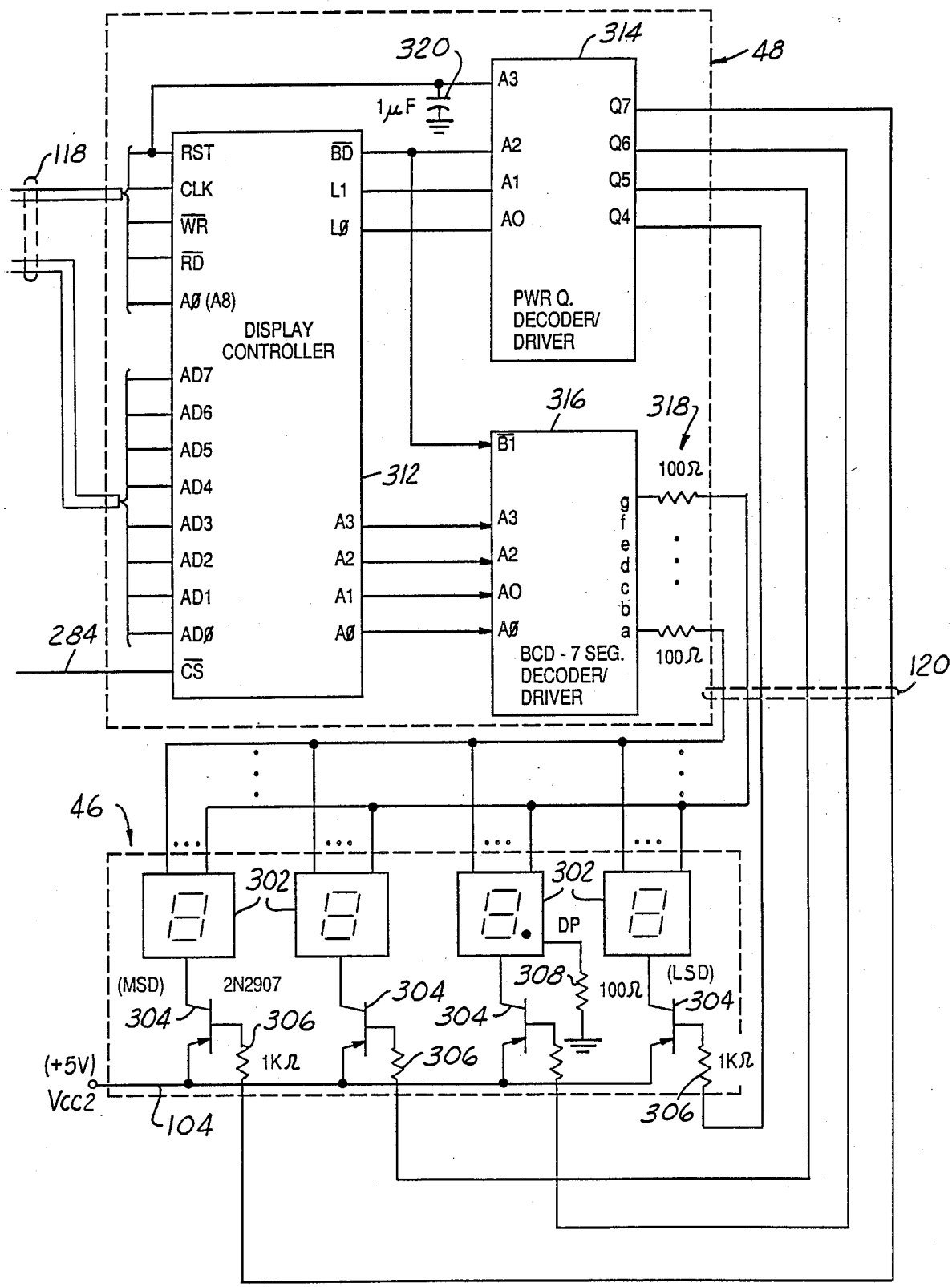

FIG. 3C shows a preferred embodiment of the multiple digit display 46 and the display control circuit 48. The display 46 includes four individual seven segment digits 302, four power transistors 304, four base current-limiting resistors 306, a load resistor 308 for the decimal point on the third digit, all connected as shown. The display control circuit 48 includes display controller chip 312, power transistor decoder/driver chip 314, a BCD-to-seven-segment decoder/driver 316, current-limiting resistors 318 for the segments of digits 302 and a time delay capacitor 320 to lengthen the time required to reset the display controller 312 and decoder/driver 314. Typical components used in controller 40 may be as set forth in Table I below

TABLE I

| Ref. No. | Item | Manufacturer | Part No. |
|---|---|---|---|
| 68a, 68b | 12-bit counter | Motorola | 4040 |
| 70a-70c | 8-bit latch | Motorola | 74LS374 |
| 188 | voltage regulator | Motorola | 7805 |
| 216, 576 | operational amp | Motorola | LM3900 |
| 230, 232 | 2-Input NAND Gate | Motorola | 74LS132 |
| 234, 236 | D-type Flip Flop | Motorola | 74LS74 |
| 250 | microprocessor | Oki | M80C85A-2 |
| 254 | RAM & I/O port | Oki | M81C55 |
| 256, 314 | BCD-to-Dec. decoder | Motorola | 74LS145 |
| 258 | EPROM (8K × 8) | Seeq | DQ2764.4 |
| 260 | address buffer latch | Motorola | 74LS373 |
| 302 | 7 segment LED digit | Fairchild | FND507 |
| 304 | power transistor | -any- | 2N2907 |
| 312 | display controller | NEC | 8279 |
| 316 | BCD-to-7 Seg. decoder | Motorola | 74LS47 |

Having reviewed the various components shown in FIG. 3, the operation of the electronic controller 40 will now be described in detail with reference to the timing diagram of FIG. 4, which shows ten waveforms along a common horizontal time line. For convenience, the waveforms or signals shown are identified by the reference numeral for their conductor or signal path preceded by the letter "S".

Figures 4, 5:
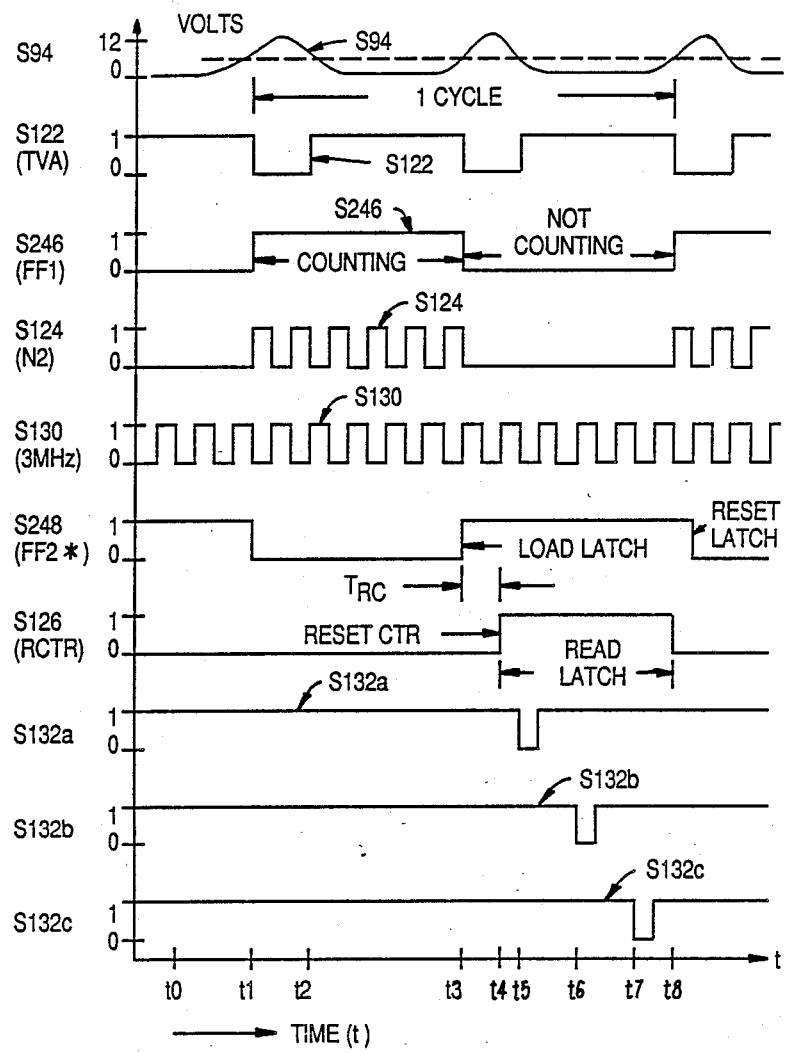
FIG. 4 is a timing diagram which helps illustrate the internal operation of the flowmeter, particularly the function of the counter and gating control circuit.
FIG. 5 is a table showing one arrangement for the flow linear approximation values used to compensate for the flow rate versus revolutions per second (RPS) of one axial-flow turbine flowmeter.

As previously explained with respect to FIG. 2, proximity switch 38 produces an analog signal S94 shown in FIG. 4 which is converted into a square wave signal S122, also known as the TVA signal, by sensor interface circuit 66. The TVA signal passes through NAND gate 230 which increases its slew rate and inverts it for delivery via line 245 to the clock input of the first flip-flop 234. This causes the output of flip-flop 234 to go high at time t1 as shown by signal S246 in FIG. 4. The microprocessor 250 produces a 3 MHz external clock signal on line 130 which is shown as signal S130 in FIG. 4, which serves as the high-speed time base used by counter gating and control (CGC) circuit 72 in a manner that will now be described. When the output of flip-flop 234 is high, the second NAND gate 232 outputs a square wave signal S124 shown in FIG. 4 as long as signal S246 from flip-flop 234 is high. Signal S124 serves as a clock input to the first 12-bit counter 68a. Where signal S246 is high long enough, the count exceeds the capacity of counter 68a, and producing an overflow at its output Q11 into the clock input of 12-bit counter 68b via conductor 249. The overall capacity of high-speed digital counter 68 is selected to accommodate or exceed the highest current count number (CCN) expected to occur, which is a function of the lower detectable limit of turbine rotation of turbine 34 which still produces reasonably accurate flow measurements. This may be determined experimentally. In presently preferred embodiments of the electronic flowmeter system 30 which utilize the axial-flow turbine shown in FIGS. 7-10, the frequency of signal S94 may be at least as low as about 1 Hz, which corresponds to a turbine rotation rate about 0.167 rps.

At time t2 shown in FIG. 4, the TVA signal on line 122 goes high, as shown by waveform S122. At time t3, the waveform S122 goes low again as the next vane 36 is detected by proximity switch 38. This causes the first flip-flop 234 to go low as shown by waveform S246, and the second flip-flop 236 goes low, so that its inverted output on line 248 goes high as shown by waveform S248 in FIG. 4. The counting in counter 68 ends when signal S246 goes low. When flip-flop 236 is turned off, signal S248 goes high which clocks all three latches 70a, 70b and 70c simultaneously at time t3, causing the current count number CCN stored in 24-bit counter 68 to be loaded into latch 70 via conductors 110. When the first flip-flop 234 goes low at time t3, line 247 goes high, causing the time delay circuit 238 to become active. Specifically, current flowing from line 247 through resistor 240 charges capacitor 242. After a predetermined time delay determined by the component values of resistor 240 and capacitor 242, the reset counter signal RCTR on line 126 goes high at time t4 as shown by waveform S126 at time t4, causing the 24-bit counter 68 to be reset. When signal S126 goes high, it also interrupts the microprocessor 250, causing the microprocessor to begin reading the CCN presently stored in the latch 70. This is accomplished in three distinct steps initiated at times t5, t6 and t7 as shown by signal waveforms 132a, 132b, and 132c in FIG. 4. Specifically, each of three lines 132a-132c is normally high, and goes low upon command from the microprocessor 250 in order to read its respective 8-bit latch. For example, when signal 132a goes low at time t5, 8 bits of data from latch 70a is output via parallel conductors 112a onto the I/O bus 112. The data on the bus 112, and is read by I/O block 254. After latches 70a-70c have been read, microprocessor 250 then processes the data to compensate for predetermined nonlinearities, if any, and takes an average of several successive CCN values as previously explained. Note that the counter 68 does not begin counting again until time t8, when the foregoing cycle repeats itself.

FIG. 5 is a table which illustrates how the nonlinearities in the low-flow region of an axial-flow turbine flow meter shown in FIGS. 7-10 are adjusted for using different linear approximation (LA) values for different flow ranges within the low-flow region of operation of the flowmeter. The table has ten rows dividing the operation of the flowmeter up into ten flow ranges as shown in column 334. A greater or lesser number of flow ranges with different maximum and minimum flow rates could be used if desired or required. Experimental measurements with a prototype FIG. 7 flowmeter showed that five different linear approximation values were required to correct for nonlinearities in the range of flow between 0.1 gpm and 100.0 gpm in order to obtain an accuracy of better than 1% over the full range of flows which could be measured by available equipment. The laboratory test equipment utilized to make the test measurements could only accurately measure flows in a calibrated manner down to 0.1 gpm. This limit is not believed to represent the lower flow rate limit of the turbine flowmeter system of the present invention since the turbine still rotates at even lower flow rates such as about 0.05 gpm. Note that the first three gpm ranges in rows 1-3 (from 0.1 gpm to 1.5 gpm) required the same linear approximation value, namely 670,000 as shown in the first three entries of column 336 in table 330. It may be, that with more sensitive test equipment, the LA values for these ranges might need to be slightly different from one another.) The next four flow ranges in rows 4 through 7 required four different linear approximation values ranging from 615,000 to 585,000. This last LA value proved sufficient for all higher ranges of flows indicated in rows 8 through 10 as well. Column 338 and 340 of the FIG. 5 table list the vane frequency $f_v$ of signal S94 from the proximity switch and the corresponding maximum rate of rotation in revolutions per second of the turbine in the FIG. 7 flowmeter. As may be seen from the entry in row 7 of column 340, the nonlinearities become evident somewhere below five revolutions per second for the axial-flow turbine construction of the type shown in FIG. 5. The data in the FIG. 5 table was taken when 150 SSU hydraulic oil was being run through the FIG. 7 flowmeter. Further experimentation showed that the flowmeter was still quite accurate for hydraulic fluids having a viscosity between about 100 SSU and 300 SSU using the LA values of column 336.

As earlier explained, the microcomputer system 42 determines what flow range the rate of turbine rotation corresponds to by examining the current count value. Column 342 lists the minimum CCN values for the several flow ranges, which are obtained by dividing the high-frequency time base frequency, which is 3 MHz, by the vane frequency listed in the same row of column 338. In the prototypes of the electronic flow meter system 30 built thus far, the size of the FIFO buffer has been fixed at M=10. As column 344 in the FIG. 5 table shows, the FIFO buffer size could readily varied depending upon the current flow range, for reasons previously explained. The entries of column 344 represent one possible set of values of FIFO size as a function of the ten different flow ranges listed in column 334. Tests show that the FIG. 7 flowmeter is very accurate without any compensation for nonlinearities between about 5.0 gpm to 100 gpm, that is, about 1.5 orders of magnitude, but become increasingly inaccurate as flow is decreased. By compensating for the nonlinearities as described above, the flow meter is made highly accurate over at least an additional 1.5 orders of magnitude, thus increasing the effective high accuracy range of the axial-flow turbine flowmeter shown in FIGS. 7-11 from 1.5 orders of magnitude to at least about 3.0 orders of magnitude. In a larger axial-flow turbine flowmeter constructed just like the FIG. 7 flowmeter, but having a 1.325 inch diameter bore, the flowmeter has been shown to be very accurate from about 5 gpm to 150 gpm, or two orders of magnitude without any compensation. By compensating for nonlinearities in the manner described above, the effective high-accuracy range of the larger flowmeter was also extended down to 0.1 gpm, giving it high accuracy over about 3.5 orders of magnitude. It is expected that the ranges of both sizes of flowmeters can be extended still further to flows somewhat below 0.1 gpm while still maintaining good accuracy.

Figure 6:
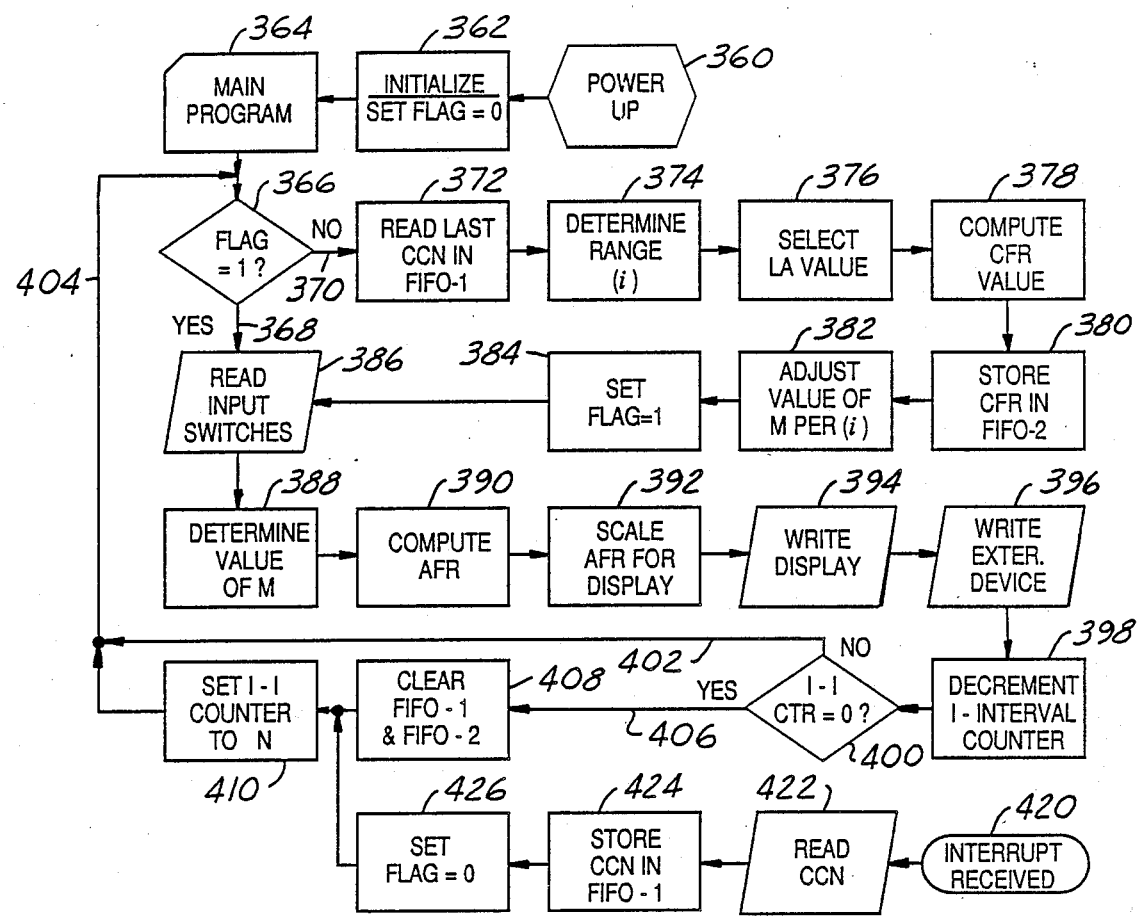
FIG. 6 is a software flowchart showing the overall sequence of signal processing and calculation operations carried out by the electronic controller.

The FIG. 6 software flowchart indicates how microcomputer system 42 internally processes the digital data which comes to it from the signal processing circuitry 44 shown in FIG. 3a. The sequence of operation begins with block 360, when the computer system 42 is powered up. System 42 is initialized as indicated at block 362. The initialization routine includes conventional self-test functions, clearing the FIFO buffers, and setting values of a variable M and N.

The main program is then entered at block 364 of FIG. 6. Decision diamond 366 indicates that the status of the flag is checked. If the flag is set to 1, the system 42 proceeds along control path 368. However, if the flag is reset, that is, has a zero value, the software proceeds along path 370, and the last-entered CCN value in the first FIFO buffer (FIFO-1) is read. If the CCN value is zero, the system 42 realizes that the FIFO buffers are empty and proceeds to write a zero on the visual display 46 by passing over blocks 374-384 and proceeding directly to block 386. However, if the CCN value is non-zero, the software determines the flow range, as indicated in block 374. This is done by comparing the CCN value against a simplified version of the FIG. 5 table, which includes only the data of columns 342, 336 and 344, which is stored in the EPROM 258. The row or entry number in the array which is selected is determined by the largest entry in column 342 which is less than or equal to the CCN value. Once the row number (i) has been determined, the corresponding linear approximation (LA) is selected from column 336 in the table in EPROM 258. Next, the current flow rate (CFR) value is computed by dividing the CCN value by the selected LA value. This CFR value is thus the numerical value which has been adjusted to compensate for the predetermined nonlinearity between the rate of rotation of the turbine and the rate of fluid flow through the flowmeter body, at least in a low-flow region of operation of the flowmeter.

Next, as indicated in block 380, the CFR value just calculated is stored in the second FIFO buffer (FIFO-2). If an adjustable FIFO size is being used, the FIFO size, that is, the M value, is also determined at this time, as indicated in block 382, from column 344 in the simplified table in EPROM 258. Next, the flag is set as indicated in block 384, and then the input switches 76, 78, 286, 288 of the operator input means are read, as indicated in block 386. Control next passes to block 388 which acquires the last value that has been set to, and then computes the average flow rate as indicated by the mathematical average of the last M entries in the second FIFO buffer. In the prototype system 30, the LA values in FIG. 5 were selected so that the CFR value and AFR value would be a number representing tenths of gallon per minute, and the values of CFR and AFR are calculated to an accuracy of one-hundredths of a gall per minute, but could be calculated more accurately if desired. The AFR value just calculated in block 390 is appropriately scaled, as indicated in block 392 to the units, such as gpm, cubic inches per second or liters per minute, to be displayed, and then this scaled value is written to the display 46 via display controller 48 shown in FIG. 3C. Also, if an external device interface 52 is being used, the same (or differently) scaled value may be written to it by microcomputer 42 at this time as indicated by block 396 in FIG. 6.

Next, the interrupt-interval (I-I) counter is decremented as indicated in block 398. Immediately thereafter, this counter is checked to determine if it is zero, as indicated by decision diamond 400. If the I-I counter is not zero, the software control jumps back to the beginning of the program, as indicated by unidirectional flow lines 402 and 404. If the I-I counter is zero, control passes along path 406 to routine 408 which clears both FIFO buffers by setting all entries therein to zero. Thereafter, routine 410 sets the I-I counter back to its original maximum value N. The value of N is selected based upon how long it is appropriate to wait for an interrupt signal on line 126 before being willing to conclude that the turbine has stopped rotating. The decrementing of the I-I counter thus constitutes a timing mechanism based upon the amount of time required to complete one pass through the main program from decision diamond 366 to block 398. A reasonable value for N may be determined experimentally. In the prototype of system 30, N was selected to produce a time interval of 2 to 4 seconds.

When microcomputer 42 receives an interrupt signal on line 126 from the signal processing circuitry 44, the software responds by jumping to an interrupt routine at oval block 420 shown at the bottom-right corner of FIG. 6. This routine reads the current count number just produced by circuit 44 in three successive cycles from the 8-bit latches 70a-70c over the I/O bus 112. The acquired CCN number is still stored as an extended precision value in the first FIFO buffer as indicated by block 424, which retains all of the most recently acquired CCN values from signal processing circuitry 44. The size of the first and second FIFO buffers should be at least equal to the maximum value of M the microcomputer system 42 is programmed to allow. The flag is reset as indicated in block 426, and the I-I counter is set to N as indicated in block 410. Thereafter, control follows path 404 to the beginning of the main program, and the foregoing cycle is repeated. Those skilled in the programming arts will be readily able to prepare computer programs for microcomputer 42 from the description presented herein. Therefore, there is no further need to discuss the software or its operation here. Those in the art should appreciate that the steps of sequence of operation set forth in FIG. 6 may be rearranged, or implemented in other ways, as long as the necessary basic functions just described end up being performed.

Figures 7, 8:
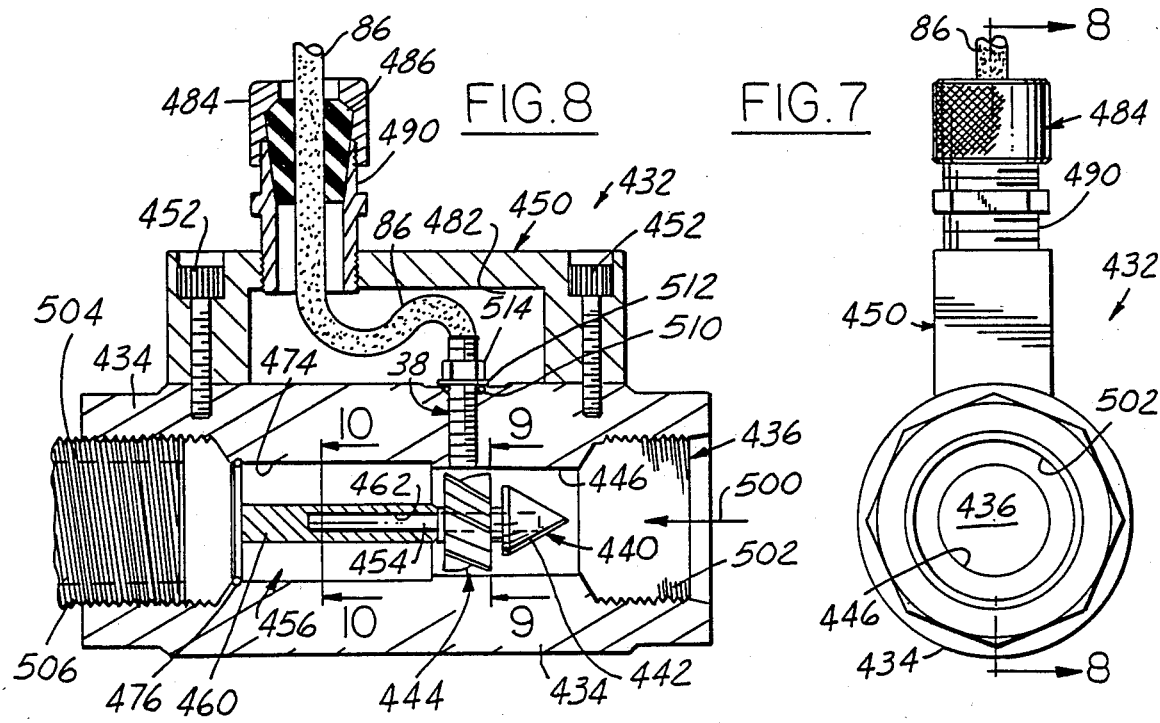
FIG. 7 is a front view of a preferred turbine flowmeter used in the present invention, which has a turbine that rotates transversely to the fluid flow.
FIG. 8 is a cross-sectional view of the FIG. 7 turbine flowmeter.

FIGS. 7 and 8 are front and side cross-sectional views of a preferred axial-flow turbine flowmeter 432 of the present invention. Flowmeter 432 includes a substantially cylindrical turbine body 434 having a passage 436 all the way therethrough, a turbine assembly 440 having a nose cone 442 and turbine 444 disposed within a substantially cylindrical bore 446 of passage 436, a vane sensor such as magnetic proximity sensor 38, and a sensor enclosure 450, bolted to the body 434 by conventional threaded fasteners 452. The turbine assembly also includes an elongated cylindrical shaft 454, and a flow-stabilizing separator 456 having at least three blades 458 and a central section 460 having an elongated bore 462 therein into which the shaft 454 is press-fit. Turbine assembly 440 also includes bearing means 464 mounted on the shaft for rotatably supporting the turbine 444 on the shaft 454 as best shown in FIG. 9, which is a front view of the turbine 444 disposed in cylindrical bore 446. As shown in FIG. 9, the turbine 444 preferably has six vanes 468 integrally formed on a formed hub 470. A cylindrical bore 472 in the hub 470 is sized to allow bearing means 464 to be press-fit into the hub.

FIG. 10 shows a cross-sectional view of the separator 456, which is disposed in a slightly larger cylindrical bore section 474 of passage 436 in the turbine body 434. Separator 456 is held in the bore 474 by conventional retaining means 476 which is preferably a spring-steel retaining ring made from 0.040 inch diameter wire as best shown in FIG. 10, and which sits in a cylindrical groove 478 provided at the downstream end of bore 474.

As shown in FIGS. 7 and 8, the vane sensor 448 has an electrical cable 86 which curves around within chamber 482 and then exits through conventional electrical fitting 484 which includes an elastomeric grommet tightened down about the cable 480 by rotation of the cap nut 488 about the stationary conduit 490 which is threaded or otherwise attached to enclosure 450. The use of cable 480 allows the electronic controller 40 of the electronic flowmeter system 30 to be located remotely from the flowmeter 432.

The direction of fluid flow through flowmeter 432 is indicated by arrow 500. Conduit or pipe connections may be made to the turbine body 434 by any conventional or suitable means such as internal NPT or SAE threads indicated at inlet 502 or outlet 504, shown with a pipe 506 threaded therein. For high-pressure applications, any conventional or suitable fittings may be provided in place of the threaded inlet and outlet, including flared fittings, or Seal-Lok fittings from the Tube Fittings Division of Parker Hannifin Corporation of Columbus, Ohio.

In the prototype flowmeter 432 of the present invention, the body 434, nose cone 440 and separator 456 are all made out of 2024T351 or 2011T3 aluminum alloy, while turbine 444 is machined out of an easily-machined ferromagnetic material such as Led-Loy 300 available from Joseph T. Ryerson & Sons, Inc. of Detroit, Mich. The shaft 454 is made out of a 0.125 inch drill-steel blank, and the bearing means 464 is a Model No. E4-7 stainless steel ball-bearing assembly both available from Precision Industrial Components, Inc., of Middlebury, Conn. All of these materials may be made out of any other conventional or suitable materials. The proximity sensor is preferably the Namco Controls Model No. ET111, as previously mentioned. This proximity sensor comes with a threaded housing, which is screwed into a corresponding threaded opening in the turbine body 434 as shown in FIG. 8. Conventional O-ring 510, flat washer 512 and retaining nut 514 are provided to seal against leaks and lock the proximity sensor 38 in place.

The turbine 444 for the prototype flowmeter 432 having a cylindrical bore 446 of about 0.75 inch in diameter had a thickness measured along the axis of the bore of about 0.31 inch. This turbine 444 was machined on a Bridgeport mill using a conventional fluting fixture with the lead angle set to 45 degrees, resulting in a turbine, as best shown in FIGS. 8 and 9 which has blades that are swept back at an angle. The thickness of the vanes or blades is preferably on the order of about 0.035 inch to about 0.080 inch, with about 0.045 inch being preferred. The selection of the clearance, between the outer tips 518 of the vanes or blades 468 and the cylindrical bore 446 in which the turbine 444 rotates concentrically therein, is very important to optimizing the design of flowmeter 432 for very low flow rates. This clearance is indicated as dimension 520 in FIG. 9. In conventional axial-flow turbines similar in appearance to turbine 444, the clearance is fairly large, normally between 0.050 inch and 0.10 inch. For flowmeters having a bore size of 0.625 inches and larger, measuring flow rates in excess of 5 gpm, this relatively large clearance does not lead to appreciable loss of accuracy in measurement. However, in developing the present invention, it has been determined that the size of the clearance 520 is quite important in obtaining accurate measurements at extremely low flow rates, i.e., flow rates wherein the turbine rotates at about one revolution per second or slower. We have found that a clearance of about 0.030 inch is optimal for 150 SSU hydraulic oil, and also works very well for hydraulic fluid having a viscosity in the range of 100 SSU to 300 SSU.

The graph in FIG. 12 conceptually shows the results of experimentation which was conducted with 150 SSU hydraulic fluid during the course of developing the present invention to optimize the clearance dimension 520 for flowmeter 432. The curve 524 shows the minimum detectable flow rate in gpm as a function of clearance dimension 520, expressed in inches. By minimum detectable flow rate, it is meant the flow rate at which rotation of the turbine 444 is still detected. In the area above curve 524, the turbine 444 will rotate. In the area below curve 524, such as areas 526 and 528, the turbine 444 will not rotate. The knee 530 of the curve 524 thus represents the optimal clearance dimension 520. For clearances in excess of about 0.030 inches, some of the fluid passing through flowmeter bore 446 apparently goes around the tips 518 of vanes 468 of the turbine 444 that is through the clearance area, as well as through the openings between adjacent vanes 468. The reduced sensitivity of the flowmeter as indicated by left portion 534 of curve 524 is believed to be a result of viscous coupling between the outer tips 522 of the vanes 468 and the surface of cylindrical bore 446. While the clearances of 0.030 inch according to the tests conducted appear to be optimal, those skilled in the art will appreciate that the same kind of test can be conducted for axial-flow turbines of other vane designs or having more or fewer than six vanes, and may also be conducted for turbines of the paddle-wheel type as well. Also, they may be conducted using any one of different types of liquids or fluids to be passed through the flowmeter, so that the clearance 520 can be optimized for any given liquid, if desired. For example, it is expected that liquids having a viscosity well under 100 SSU may in fact be able to have a clearance dimension 520 considerably smaller than that which is optimal for 150 SSU hydraulic oil.

Thus far the proximity sensors which have been discussed with regard to the FIG. 1 and FIG. 7 turbine flowmeters have been magnetic proximity sensors. Although the Namco proximity switch sensor 38 previously mentioned works very satisfactorily in the prototype flowmeters, it has a very significant temperature limitation since the integrated circuitry within the sensor self-destructs at temperatures at 160 degrees F. or above. Since many hydraulic systems operate continuously or at least on occasion with hydraulic fluid temperatures at or above 160 degrees F., and since the valve body 434 is heated to substantially the temperature of the liquid passing therethrough in very short time, this has proved to be a very significant problem to the sustained operation of the flowmeter for hydraulic fluid power applications. Also, this proximity sensor is not designed to accept extremely high pressures, such as those in excess of 100 to 400 atmospheres, and it is not designed so as to be resistant to many forms of chemical attack.

In FIG. 12, there is shown conceptually an optical technique of the present invention for overcoming the limitations of temperature, pressure and chemical attack just mentioned. FIG. 12 also shows a circuit 540 which may be used to power and detect light from an optical vane sensor. The circuit includes an artificial light source section 542 including artificial light source 544 which may be an incandescent bulb or a light-emitting diode 544 as shown. Resistor 546 serves to limit the current through the light source 544 to a safe value. Photodetector section 552 of circuit 540 includes a phototodetector 554, which may be a conventional phototransistor and a DC isolation capacitor 556 having some internal leakage represented by resistor 558. In FIG. 12, there is shown a representation of turbine 444 rotating on shaft 454. The optical sensing means includes conduit means 560 including optical conduits 562 and 564 which respectively serve to direct or channel light from the source 544, represented by arrow 566, to a predetermined location 565 through which the tips 518 of the blades 468 pass, causing light, as represented by arrow 568, to be reflected off of any tip 518 present there through conduit 564 to phototransistor 554. The reflected light 568 hits the base region of the phototransistor 554, thus causing the phototransistor to become conducting and accordingly charge up capacitor 556 faster than it can bled off by resistor 558. As a result, the voltage on conductor 572 rises and falls, by at least several tens of millivolts periodically in unison with the presence or absence of the vane tips 518 at the predetermined location 566. Circuit 540 also contains an amplifier section 574 including two identical operational amplifiers 576 and 578, each configured by the resistor networks shown to have a gain of 10, so that the overall amplifier section 574 has a gain of 100. The small voltage signal on conductor 572 is inverted and amplified by op-amp 576 and its output on conductor 580 is similarly inverted and amplified by second op-amp 578, resulting in a turbine vane present (TVP) signal on conductor 582.

The circuit 540, including its output signal TVP on conductor 582 may be substituted directly into the electronic circuit shown in FIG. 2 in place of the sensor interface circuit 66. Although the polarity of the TVA signal and TVP signal are opposite, the design of the remainder of the electronic controller, including the CGC circuit 72, is such that the controller 40 is able to operate very satisfactorily. In a preferred embodiment of the circuit 540, a 1.0 microfarad capacitor with a very small amount of internal leakage is used as the capacitor 556. The size of the capacitor and the values of the various resistors in the amplifier section 574 were all experimentally determined in order to be able to produce a zero volt to 5-volt signal as an output on line 582 at the maximum expected vane frequency $f_v$, corresponding to the maximum rate of rotation for the turbine 444 at maximum expected fluid flow rates. Those skilled in the art will appreciate that other interface circuits could readily be utilized to produce substantially the same result as the circuit 540 shown in FIG. 12.

FIGS. 13–15 show a preferred optical sensing means 600 for use with the turbine flowmeter of the present invention. The optical sensor 600 includes an optical sensing head 602 having a fiber optic cable 604 extending therefrom. The front end of the sensing head 602 is disposed in a complementary opening in an optical sensor housing 606. At a location remote from the sensor housing 606 is a conventional optical input/output connector 608 for the cable 604 which may be mounted on a printed circuit board 610 or other suitable bracket via a bracket 612 or other conventional fastening means. The I/O connector 608 includes two discrete optical conduits 614 and 616 which respectively may be inserted into openings in blocks 618 and 620. Block 618 represents a conventional opaque housing having the optical light source 544 therein while block 620 represents a conventional opaque housing for photodetector 554. The design and construction of optical I/O connectors and blocks like connector 608 and blocks 618 and 620 is well-known in the fiber optic cable art and need not be described here. In prototypes of the optical sensor 600 of the present invention, a ready-made cable assembly including optical sensor head 602, cable 604 and optical I/O connector end 608 including conduit 614 and 616 has been utilized. Such an optical cable assembly is available from Skan-A-Matic Corporation of Elbridge, N.Y. as Part No. F17312, among other sources. Note that this company regularly produces such optical cable assemblies, which may be as short as a few inches up to many feet in length. The length is changed by simply changing the length of cable 604. Cable 604 has a conventional sheath or protective covering rendering it opaque to the frequency of light emitted from light source 544, which is preferably in the visible or infrared regions of the electromagnetic spectrum. Thus, it will be appreciated that the optical signal 568 is also an electromagnetic signal.

The optical sensing head 602 on the Skan-A-Matic assembly just mentioned includes a threaded metallic cylinder as a casing to facilitate its convenient mounting into a threaded fixture near the object to be detected. Within the head 602 and cable 604 are the two optical fibers 566 and 568 for respectively carrying light between the source 544 to the end of housing 602 and back to the photodetector 554. This is shown more clearly in FIG. 14 which shows the beam of light 566 exiting from the end of optical conduit 562, being reflected off of the tip 518 of turbine vane 468 as light ray 568, which enters optical conduit 564 for delivery to photodetector 554.

The construction of the optical sensor housing 606 proved both necessary and desirable since the end of the Skan-A-Matic optical head 602 was not designed to withstand moderate or high hydraulic pressures or attack by a number of chemicals. The optical sensor housing 606 includes a rigid casing 640 having a large portion 642 with a hexagonal cross-section for easy manipulation by a wrench and a threaded cylindrical section 644 for screwing into a corresponding threaded opening 646 in the turbine body 434 made to receive the portion 644 and locate it directly adjacent and nearly tangent to the turbine 444 as shown in FIG. 14. The casing 640 is preferably made out of a strong machineable material capable of withstanding chemical attack, such as stainless steel. The casing has an elongated hole 650 therethrough with first, second and third regions 652, 654 and 656 of differing nominal cross-sectional areas with the casing having a shoulder 660 at the boundary between the first and second regions, and another shoulder at the boundary between the second and third regions. Within the first region 652 is securely mounted a protective window 664 as shown. The window 664 is made at least primarily of optically transparent material resistant to thermal shock which can withstand a sustained temperature in excess of 300 degrees C. and which has first and second conventionally polished surfaces 666 and 668. The window 664 has a thickness (that is, its dimension in the vertical direction of FIG. 14) relative to its lateral dimension (that is, its horizontal dimension in FIG. 14), which enables the window to withstand a static pressure difference of at least about 5 atmospheres across the window produced by a pressurized condition of the fluid in the passage 436 and bore 446 of the turbine body 434. In a preferred embodiment, the window 664 is a borosilicate glass material, such as Corning Code 7740 glass, more popularly known as Pyrex glass, which is approximately 0.125 inches thick and has a diameter of about 0.25 inch. The end of the threaded portion 644 may be rolled, punched or pressed to form a small continuous or intermittent lip 672 to retain the glass 664 within the first hole region 658.

The optical sensor housing 606 is also preferably provided with two elastomeric seals 676 and 678 located at the inner shoulder 660 and outer shoulder 680 of the casing 640. The seals are preferably O-rings made of a resilient deformable, substantially incompressible material resistant to attack by many solvents, acids and bases used in industry. In the prototype flowmeter 432, Viton O-rings (Part Nos. 5-193 and 5-1007) from the Stillman Seal Division of Sargent Industries, Inc. in Carlsbad, Calif. were used for the seals 676 and 678. The seal 676 is substantially fully compressed at the time that the lip 672 is bent inwardly in order to retain permanently the window 664 in the opening 658. To make the following discussion and figures easier to follow, however, the seal 676 is shown in a slightly compressed state in FIG. 14 or 15.

The O-ring or seal 676 serves a dual purpose. In addition to helping prevent leakage around the protective window 664, the O-ring 676 also helps cushion the glass as it contacts the shoulder 660, especially when high-pressure fluid is bearing against the window 664 from the cylinder bore 446 side of the window. The side of protective window 664 which has the optically polished surface 668 on it has an annular recess 684 ground into it whose inner diameter 686 is greater than the diameter 688 of the second portion 556 of the hole 650. Thus, when the window 664 tries to move in the direction indicated by arrow 690 in FIG. 15, the polished surface 668 is supported along its periphery at annular region 692. However, the size of the O-ring 676 relative to the size of the cavity 694 formed by the removed material to create the annular recess is preferably such that the flexible Viton material of the seal 676 completely fills the cavity 694 slightly before or as the surface 668 contacts the shoulder 660, and extrudes outwardly to fill substantially the annular gap 696 at the time the lip 672 is formed. Accordingly, the window 664 is significantly cushioned, thereby allowing it to withstand static fluid pressures in excess of 300 to 600 atmospheres without shattering. In a test with the recess and O-ring located as shown in FIG. 14, the glass did not shatter until a static pressure difference of about 15,000 psi was reached. In these experiments, the dimension of glass window 664 was as given above, and diameter 686 was 0.185 inch and diameter 688 was about 0.125 inch.

In light of the foregoing, those skilled in the art should appreciate that the optical sensor housing 606 shown in FIGS. 13–15 is highly suitable for use in turbine flowmeters where the fluid pressure is or may be quite high such as 200, 300 or 600 atmospheres or more. Obviously, it can also be used very successfully at lower pressures such as 5–10 atmospheres to 100 atmospheres. Since casing 640 is made out of stainless steel and window 664 is made out of glass, both of which are immune to attack by most solvents, acids and bases, the optical sensor housing 606 and therefore the optical sensing means 600 is well-suited for use in environments where the fluid being measured would chemically attack other types of non-contact sensors. Also, because the optical sensor housing is made of materials which can withstand high temperatures, in excess of 300 degrees C. and up to 600 degrees C., and because the optical cable end 602 contains no temperature-sensitive electronic parts, this makes optical sensor means 600 well suited for use in such high-temperature applications without external cooling, such as a water jacket. Accordingly, a turbine flowmeter such as flowmeter 32 or 432 equipped with the optical sensing means 600 become well-suited for measuring liquids or other fluids at the foregoing high temperature ranges. One particular advantage of the optical sensor means 600 is that it allows one style of flowmeter with one style of vane detection to service all of the foregoing diverse flow-measuring applications.

The foregoing detailed description shows that the preferred embodiments of the present invention are well-suited to fulfill the objects above stated. It is recognized that those skilled in the art may make various modifications or additions to the preferred embodiments chosen to illustrate the present invention without departing from the spirit and proper scope of the present invention. For example, turbine flowmeters of different sizes and styles beyond those described herein may utilize the present invention. As another example, although the fluid referred to above has been a liquid, those in the art will appreciate that the electronic flowmeter system and/or optical sensor means described herein might also be used to measure the flow of a gas or a uniform gas-liquid mixture. Flow measurements of gas, in order to be accurate, may also well require uniform temperature and pressure differential across the flowmeter, but this can be arranged for using conventional temperature and pressure-regulating devices. Also, when the optical sensor is used, the turbine and/or its vanes may be made of non-magnetic material such as molded plastic, if desired. Accordingly, it is to be understood that the protection sought and to be afforded hereby should be deemed to extend to the subject matter defined by the appended claims, including all fair equivalents thereof.

I claim:

1. A turbine flowmeter provided with optical means for measuring fluid flow, comprising:

a flowmeter body having a substantially cylindrical bore through which a fluid to be measured flows and having a first opening in the body extending to the bore;

a turbine located entirely with the bore and having a plurality of vanes rotatable about the axis of and within the bore in response to fluid impinging upon the vanes as the fluid flows through the bore;

protective window means for enabling movement of the vanes to be detected optically, the window means being disposed in the opening in the body such that each vane in turn is optically detectable at a predetermined location within the bore as it rotates by the window means, the window means including (1) a window made of generally transparent material resistant to thermal shock and having two opposed optically polished surfaces, the window having an annular recess adjacent one of its polished surfaces, (2) a protective casing for captively supporting the window along at least substantially all of its periphery, the casing being provided with a hole including two portions of different diameters, and having an annular shoulder formed at a boundary between the two hole portions, and (3) an annular gasket disposed at least partly within the recess between one side of the window and the annular shoulder; and means for generating an electrical signal indicating whether a vane is optically detected through the window in the predetermined location, and wherein the shoulder, the recess and the annular gasket cooperate to enable the window to withstand a static pressure difference of at least about 300 atmospheres across the two opposed polished surfaces of the window produced by a high-pressure condition in the fluid in the passage.

2. A method of optically detecting rotation of a turbine having multiple vanes and rotating at least partly within a substantially cylindrical bore within a body of a flowmeter, the method comprising the steps of:

(a) providing a protective window mounted within the body through which an edge portion of each vane may be observed in sequence as each vane passes by a predetermined location within the body;

(b) illuminating the predetermined location with an artificial light source remotely located on a first side of the window opposite the vanes;

(c) detecting light from the artificial light source reflected off a predetermined edge portion of each vane as such portion passes through the predetermined location;

(d) mounting the turbine within the bore such that the turbine has an axis of rotation concentric to the axis of the bore; and (e) sizing the turbine to have a clearance with respect to the bore that allows substantially minimum resistance to turbine rotation in response to extremely low rates of fluid flow through the bore, steps (b) and (c) being carried out by transmitting light from the artificial source at a remote location through a fiber optic cable to a location near the first side of the window and transmitting light reflected off of the edge of the vane in the predetermined location back through the fiber optic cable to a photodetector at the remote location.

3. An optical sensor housing in combination with a flowmeter having a body with a passage therethrough through which the fluid to be measured flows and having a turbine provided with multiple vanes located at least partially within the passage, the sensor housing comprising:

a rigid casing having an elongated hole therethrough having first and second ends, the hole provided with first and second regions of differing nominal cross-sectional areas, such that the casing has a shoulder having an annular surface between the first and second regions;

a window mounted in the hole near the first end thereof, the window being made at least primarily of optically transparent material and having first and second opposed polished surfaces, and an annular recess in the window adjacent to the second polished surface of the window somewhat smaller in lateral dimension than the annular surface of the shoulder; and means for cushioning the window as it is pushed in the direction of the shoulder by the high-pressure fluid in the passage, said means including flexible material that deforms under pressure and which is located at least partly in the annular recess of the window, the shoulder supporting the window along at least substantially all of its periphery in a direction generally perpendicular to the second polished surface, and the shoulder, recess in the window and means for cushioning cooperating to enable the window to withstand a static pressure difference of at least about 300 atmospheres across the first and second polished surfaces of the window produced by a high-pressure condition in the fluid in the passage.

4. An optical sensor housing as in claim 3, wherein the window is made of a material resistant to thermal shock such that the window can withstand a sustained temperature in excess of 300 degrees C.

5. An optical sensor housing as in claim 3, wherein the first and second regions of the hole are substantially circular in cross-section.

6. An optical sensor housing as in claim 3, wherein:

the optically transparent material is a material highly resistant to chemical attack by a chemically active fluid passing through the flowmeter, and the casing is made of a metallic material also highly resistant to chemical attack by the chemically active fluid.

7. An optical sensor housing as in claim 6, wherein the optical transparent material is a glass material, and the gasket material is an O-ring made of material highly resistant to chemical attack, said O-ring helping to prevent the fluid from escaping from the passage into the hole by leaking around the window towards the second end of the hole.

* * * * *